United States Patent [19]

Tsuru et al.

[11] Patent Number: 4,636,009
[45] Date of Patent: Jan. 13, 1987

[54] HYDRAULIC PRESSURE CONTROL DEVICE FOR USE IN VEHICLE ANTI-SKID BRAKING SYSTEM

[75] Inventors: Naohiko Tsuru, Okazaki; Ryoichi Matsuura, Anjo; Hiromi Otsuki, Anjo; Hiroshi Fujinami, Anjo; Shinichi Hori, Anjo; Yoshihisa Nomura, Toyota; Hiroyuki Oka, Susono, all of Japan

[73] Assignees: Nippondenso Co., Ltd., Kariya; Toyota Jidosha Kabushiki Kaisha, Toyota, both of Japan

[21] Appl. No.: 714,804

[22] Filed: Mar. 22, 1985

[30] Foreign Application Priority Data

Mar. 23, 1984 [JP]  Japan ................................. 59-57130

[51] Int. Cl.⁴ ............................................. B60T 8/02
[52] U.S. Cl. ...................................... 303/93; 303/116
[58] Field of Search ............... 188/181 A; 303/92, 93, 303/104, 113, 116, 119

[56] References Cited

U.S. PATENT DOCUMENTS 3,549,212 12/1970 Leiber .
3,948,568 4/1976 Leiber .
4,090,739 5/1978 Iio .................................. 303/116 X
4,099,793 7/1978 Iio .................................. 303/116

FOREIGN PATENT DOCUMENTS 57-99446 6/1982 Japan .

Primary Examiner—Duane A. Reger
Attorney, Agent, or Firm—Cushman, Darby & Cushman

[57] ABSTRACT

A hydraulic pressure control device in a vehicle anti-skid braking system includes a wheel brake actuating cylinder for braking a vehicle wheel, a fluid pressure supply passage connected between a master cylinder and the wheel brake actuating cylinder and having a restriction, and a first directional control valve disposed in the fluid pressure supply passage and having at least pressure-increasing and pressure-decreasing modes, the first directional control valve being normally in the pressure-increasing mode to connect the master cylinder to the fluid pressure supply passage. A second directional control valve is connected between the master cylinder and the wheel brake actuating cylinder, the second directional control valve being normally open to provide a bypass passage across the first directional control valve to connect the master cylinder passage to the wheel brake actuating cylinder. A control unit is responsive to a decelerating condition of the vehicle wheel for actuating the first directional control valve into the pressure-decreasing mode and for actuating the second directional control valve to shut off the bypass passage.

9 Claims, 5 Drawing Figures

HYDRAULIC PRESSURE CONTROL DEVICE FOR USE IN VEHICLE ANTI-SKID BRAKING SYSTEM

BACKGROUND OF THE INVENTION

The present invention relates generally to a hydraulic pressure control device in a vehicle anti-skid braking system, and more particularly to such a hydraulic pressure control device with means for providing the vehicle driver a smoother braking feeling at the time when the braking of the vehicle is initiated.

Various anti-skid braking systems for use in motor vehicles have been proposed and practiced for optimizing a hydraulic braking pressure under the control of a control unit to provide a more effective and safer braking action when the vehicle is braked in different road conditions. Examples of prior anti-skid braking systems are revealed in U.S. Pat. No. 3,549,212 patented on Dec. 22, 1970 and Japanese Laid-Open Patent Publication No. 57-99446 published on June 21, 1982.

FIG. 1 of the accompanying drawings illustrates a conventional anti-skid control system (as disclosed in U.S. Pat. No. 3,948,568) including a master cylinder 1, brake actuating cylinders 2 for braking vehicle wheels, and directional control valves 4 disposed in pipes between the master cylinder 1 and the brake actuating cylinders 2. The directional control valves 4 serve to control the braking fluid pressure in pressure-increasing, pressure-decreasing, and pressure-maintaining modes. To reduce the rate of increase of the braking fluid pressure in an anti-skid control mode and also to provide better anti-skid control, each of the pipes connected to the directional control valves 4 has a restriction 5, or alternatively the directional control valves 4 have respective restrictions therein instead of the restrictions 5. However, each of the restrictions 5 tends to bring about an abrupt pressure buildup in the master cylinder 1 before a piston 8 therein moves past a port 12 leading to a fluid supply tank 10 right after a brake pedal 6 has started to be depressed by the driver. Therefore, the driver suffers a bad braking feeling when he starts braking the wheels. In addition, when the wheels are in the anti-skid control mode while they are being braked, the fluid discharged from the brake actuating cylinders 2 and pumped back to the master cylinder 1 acts on the brake pedal 6 as a kickback.

The related U.S. Patent Applications assigned to the same assignees are as follows: U.S. application Ser. No. 635,229 filed on July 27, 1984, U.S. application Ser. No. 662,630 filed on Oct. 19, 1984, and U.S. application Ser. No. 667,221 filed on Nov. 2, 1984.

SUMMARY OF THE INVENTION

It is an object of the present invention to provide a hydraulic pressure control device in a vehicle anti-skid braking system, capable of giving the vehicle driver a smooth braking feeling when the driver starts and is braking the vehicle, without imparing good anti-skid control on the vehicle wheels.

According to the present invention, there is provided a hydraulic pressure control device in a vehicle anti-skid braking system, comprising a brake master cylinder, a wheel brake actuating cylinder for braking a vehicle wheel, a master cylinder passage extending from the master cylinder, a fluid pressure supply passage connected between the master cylinder passage and the wheel brake actuating cylinder, a restriction disposed in the fluid pressure supply passage, a first directional control valve disposed in the fluid pressure supply passage and having at least pressure-increasing and pressure-decreasing modes, the first directional control valve being normally in the pressure-increasing mode to connect the master cylinder passage to the fluid pressure supply passage, a fluid pressure return passage connected to the first directional control valve, a second directional control valve connected between the master cylinder passage and the wheel brake actuating cylinder, the second directional control valve being normally open to provide a bypass passage across the first directional control valve to connect the master cylinder passage to the wheel brake actuating cylinder, and a control unit responsive to a decelerating condition of the vehicle wheel for actuating the first directional control valve into the pressure-decreasing mode and for actuating the second directional control valve to shut off the bypass passage.

BRIEF DESCRIPTION OF THE DRAWINGS

The present invention will be described in detail by way of illustrative example with reference to the accompanying drawings, in which.

DETAILED DESCRIPTION

Figure 2:
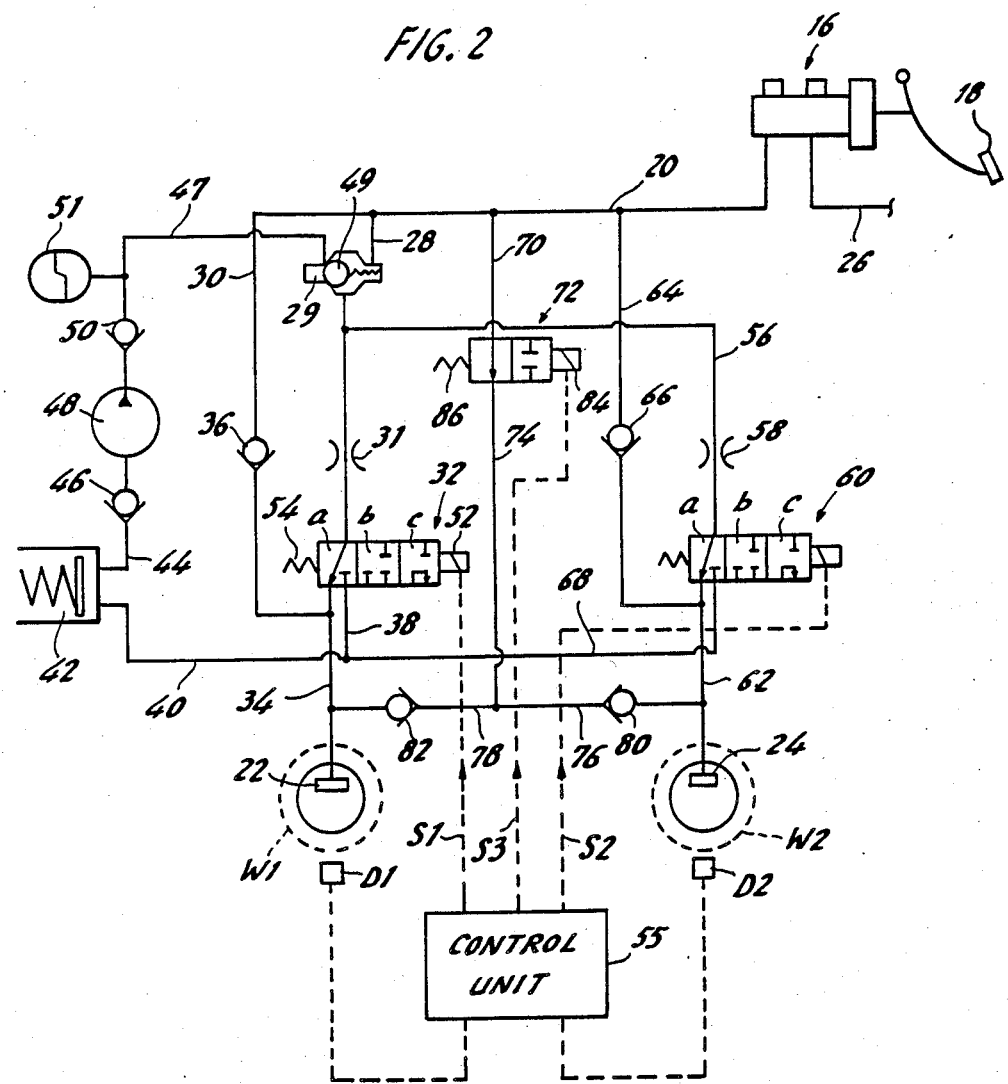
FIG. 2 is a schematic diagram of a hydraulic pressure control device according to the present invention, in a vehicle anti-skid braking system.
Figure 3:
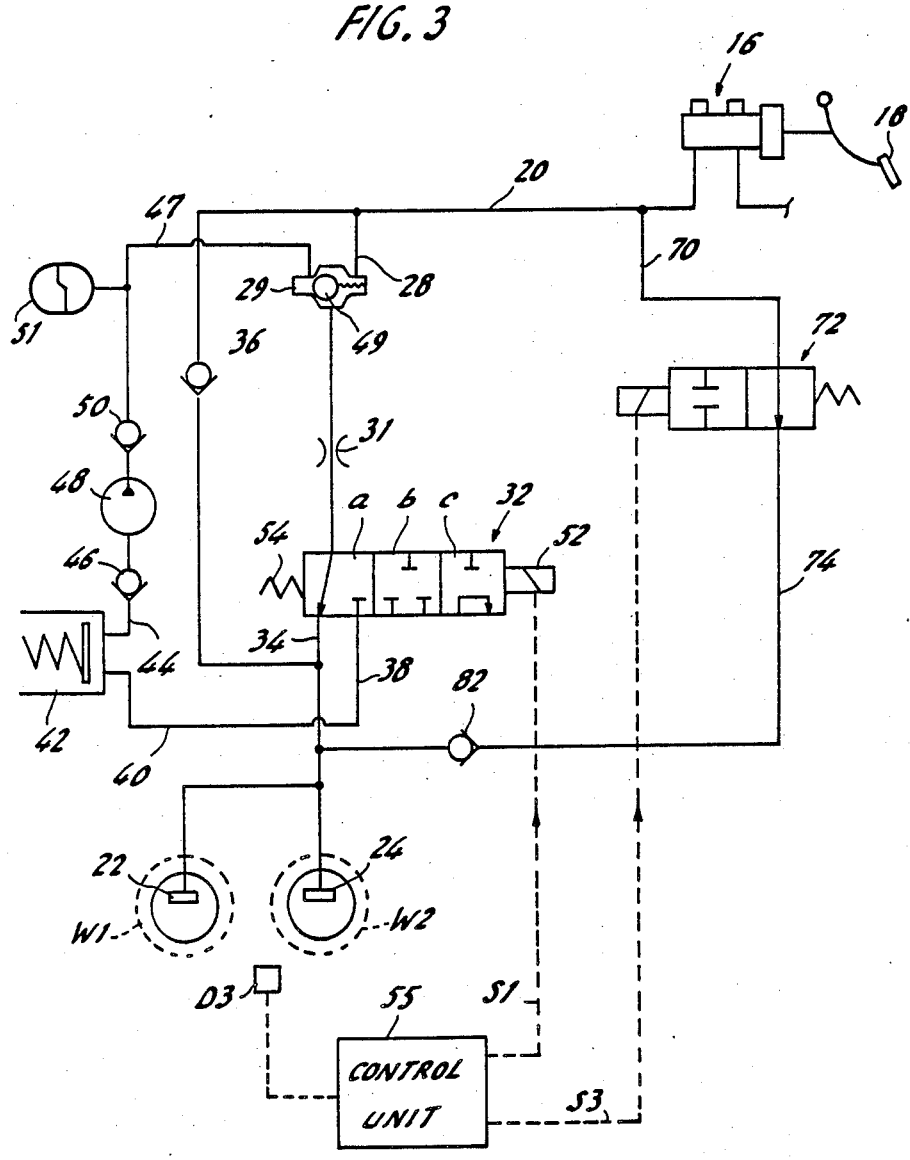
FIG. 3 is a schematic diagram of a hydraulic pressure control device according to another embodiment of the present invention, in a vehicle anti-skid braking system.
Figure 5:
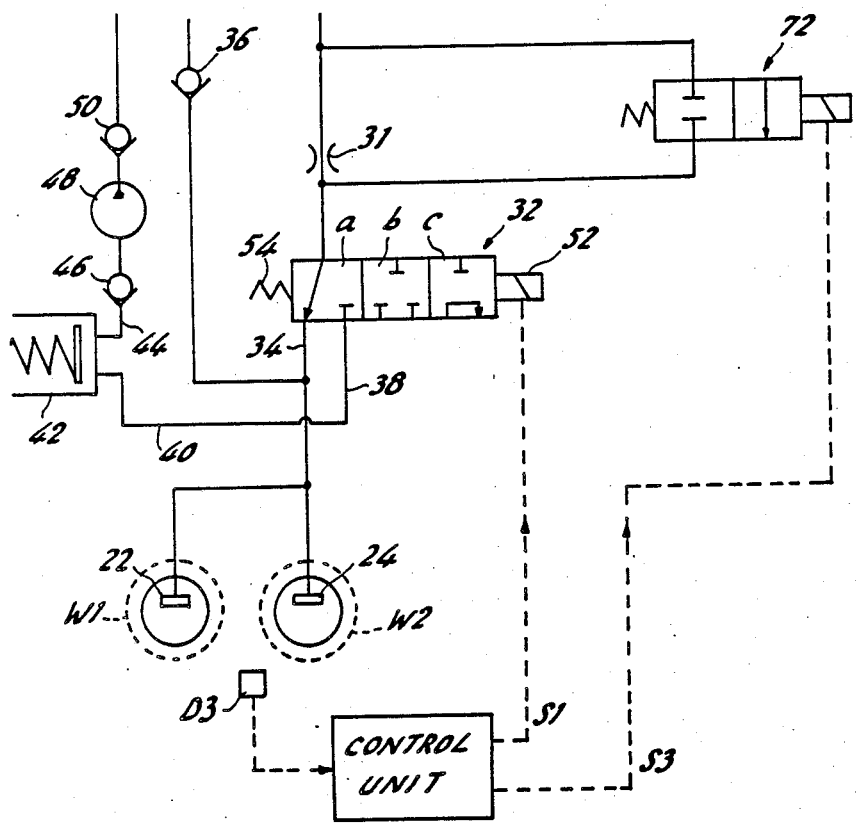
FIG. 5 is a schematic diagram of a hydraulic pressure control device according to still another embodiment of the present invention.

Like or corresponding parts are denoted by like or corresponding reference characters throughout FIGS. 2, 3 and 5.

As shown in FIG. 2, a hydraulic pressure control device according to an embodiment of the present invention, in a vehicle anti-skid braking system includes a master cylinder 16 operatively coupled with a brake pedal 18. The master cylinder 16 has a first hydraulic pressure generating chamber (not shown) connected through a pipe 20 to brake actuating cylinders 22, 24 for front wheels W1, W2. The master cylinder 16 also has a second hydraulic pressure generating chamber (not shown) connected through a pipe 26 to brake actuating cylinders for rear wheels (not shown). More specifically, the pipe 20 is branched into a supply pipe 28 and a return pipe 30. The supply pipe 28 is connected through a pressure control valve 29, a restriction 31, a directional control valve 32, and a pipe 34 to the brake actuating cylinder 22. Instead of the restriction 31 in the supply pipe 28, a restriction (not shown) may be provided in the directional control valve 32.

The return pipe 30 is coupled through a check valve 36 and the pipe 34 to the brake actuating cylinder 22, the check valve 36 allowing the fluid to flow only in a direction from the brake actuating cylinder to the master cylinder 16. A pipe 38 is connected to the directional control valve 32 and also connected through a pipe 40, a reservoir 42, a pipe 44, a check valve 46, a hydraulic pressure pump 48, a check valve 50, and a return pipe 47 to a port of the pressure control valve 29. An accumulator 51 is coupled to the return pipe 47. The check valves 46, 50 are oriented such that they permit a fluid flow only in the direction from the reservoir 42 to the pressure control valve 29. The pressure control valve 29 is of a construction similar to a spring-biased ball check valve having an inlet port connected via the supply pipe 28 to the pipe 29, another inlet port connected to the return pipe 47, an outlet port connected to the restriction 31. The pressure control valve 29 also as a spring-biased ball 49 which normally allows fluid communication between the pipe 20 and its outlet port, but shuts off fluid communication between the return pipe 47 and the outlet port thereof.

Figure 1:
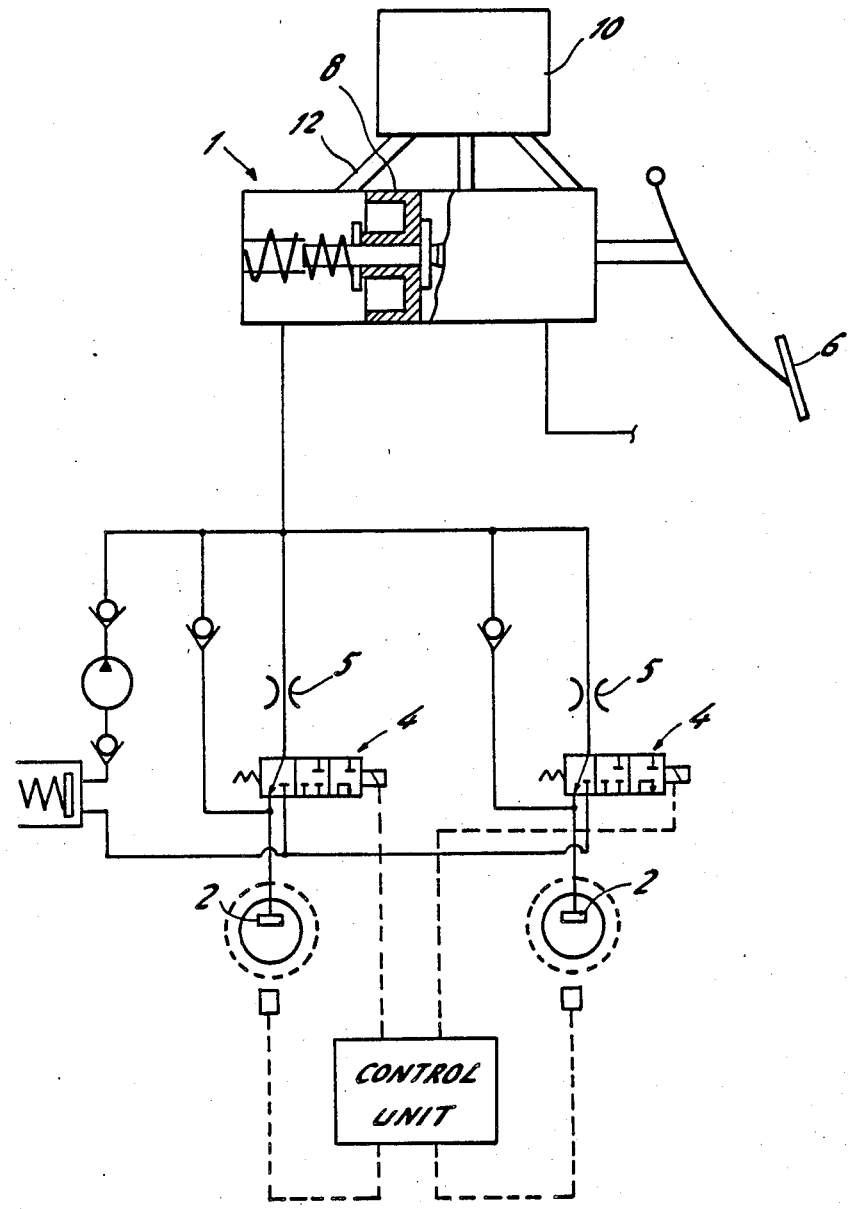
FIG. 1 is a schematic diagram of a conventional hydraulic pressure control device in a vehicle anti-skid braking system.

The directional control valve 32 is a spring-offset solenoid-operated valve of the three-port and three-position type. When a high excitation current is passed through a solenoid 52 of the valve 32, the valve 32 is actuated to the leftmost or actuated position c against the bias of a spring 54 of the valve 32. When a low excitation current is supplied to the solenoid 52, the valve 32 is positioned in an intermediate position b. When no excitation current flows through the solenoid 52, the valve 32 is biased to the rightmost or normal position a (as shown in FIG. 1) under the force of the spring 54. When the directional control valve 32 is in the normal position a, the fluid under pressure is supplied from the master cylinder 16 to the brake actuating cylinder 22, which is in a pressure-increasing mode. When the directional control valve 32 is in the actuated position c, no fluid is supplied from the master cylinder 16 through the directional control valve 32, but the fluid under pressure is discharged from the brake actuating cylinder 22 through the pipes 38, 40 into the reservoir 42. At this time, the wheel brake cylinder 22 is in a pressure-decreasing mode. When the directional control valve 32 is in the intermediate position b, no fluid under pressure is supplied to and discharged from the brake actuating cylinder 22, which is in a pressure-maintaining mode. The levels of the excitation current are determined by a control signal issued from a control unit 55, described later.

To the brake actuating cylinder 24 of the other front wheel W2, there is connected a supply pipe 56 having a restriction 58, directional control valve 60 identical in construction to the directional control valve 32, and a pipe 62, the supply pipe 56 being branched from the supply pipe 28 downstream of the pressure control valve 29. The brake actuating cylinder 24 is also connected to the master cylinder 16 through a return pipe 64 branched from the pipe 20, a check valve 66, and the pipe 62. A pipe 68 connected to the directional control valve 60 is connected through the pipe 40 to the reservoir 42. Instead of the restriction 58 in the supply pipe 56, a restriction (not shown) may be provided in the directional control valve 60.

A pipe 70 branched from the pipe 20 is connected through a directional control valve 72 to a pipe 74 which is branched into pipes 76, 78 coupled respectively through check valves 80, 82 to the pipes 62, 34. The pipes 70, 74, 76, 78 serve as bypass passages for the directional control valves 32, 60. The check valves 80, 82 are directed such that they allow a fluid to flow only in a direction from the pipe 74 to the brake actuating cylinders 22, 24. The directional control valve 72 comprises a spring-offset solenoid-operated valve of the two-port two-position type, having a solenoid 84 and a spring 86. When the solenoid 84 is de-energized (at this time, the brake actuating cylinders 32, 60 are in the pressure-increasing mode, as described later), the directional control valve 72 is biased by the spring 86 to provide fluid communication between the pipes 70, 74. When the solenoid 84 is energized (at this time, one or both of the brake actuating cylinders 32, 60 are in either the pressure-decreasing mode or the pressure-maintaining mode, as described later), the directional control valve 72 is shifted to shut off any fluid communication between the pipes 70, 74.

Although not shown, the brake actuating cylinders of the rear wheels are connected to the pipe 26 through substantially the same arrangement as that for the front wheels W1, W2.

Wheel speed sensors D1, D2 are associated respectively with the front wheels W1, W2. The wheel speed sensors D1, D2 generate pulse signals having frequencies proportional to the speeds of rotation of the wheels W1, W2 and apply such pulse signals to the control unit 55. The control unit 55 is responsive to the applied signals for computing wheel speeds, slip rates, decelerations to generate control signals S1, S2, S3. The control signals S1, S2 are supplied to the solenoids 52, 60, respectively, of the directional control valves 32, 60. When the control signals S1, S2 are of a high level, the solenoid excitation currents are also of a high level. When the control signals S1, S2 are of an intermediate level, the solenoid excitation currents are also of an intermediate level. When the control signals S1, S2 are of a low level, then no solenoid excitation current is supplied. Therefore, when the control signals S1, S2 are of high, intermediate, and low levels, the directional control valves 32, 60 are moved to the actuated position c, the intermediate position b, and the normal position a, respectively. The control signals S1, S2 will be high in level when the fluid pressure in the brake actuating cylinders 22, 24 is to be reduced in the pressure-decreasing mode. The control signals S1, S2 will be intermediate in level when the fluid pressure in the brake actuating cylinders 22, 24 is to be maintained in the pressure-maintaining mode. The control signals S1, S2 will be low in level when the fluid pressure in the brake actuating cylinders 22, 24 is to be increased in the pressure-increasing mode. The control signal S3 also generated by the control unit 55 is applied to the solenoid 84 of the directional control valve 72. When both of the brake actuating cylinders 22, 24 are in the pressure-increasing mode, no control signal S3 is supplied to the solenoid 84 to allow the directional control valve 72 to provide fluid communication between the pipes 70, 74 under the bias of the spring 86. When one or both of the brake actuating cylinders 22, 24 are in either the pressure-maintaining mode or the pressure-decreasing mode, that is, when the brake actuating cylinders 22, 24 are in an anti-skid control mode, the control signal S3 is fed to the solenoid 84 to shift the directional control valve 72 for shutting off the pipes 70, 74.

The directional control valves and the pressure control valve for the rear wheels are similarly controlled by the control unit 55 for braking the rear wheels. The control unit 55 of the above functions is of a simple conventional arrangement that could easily be achieved by those skilled in the art and hence will not be described in detail.

Operation of the hydraulic pressure control device thus constructed will be described with reference to FIG. 2.

The driver now starts depressing the brake pedal 18 while the motor vehicle is running at a constant speed. At the time of starting braking the vehicle, the control unit 55 is responsive to detected signals from the wheel speed sensors D1, D2 for determining that each wheel has not yet reached a prescribed deceleration and slip rate. The control signals S1, S2 are therefore zero in level, and the directional control valves 32, 60 are in the normal position a. At this time, the directional control valve 72 is in the open position under the bias of the spring 84 to provide a fluid passage therethrough. The fluid pressure from the master cylinder 16 is applied through the pipe 20, the supply pipes 70, the directional control valve 72, the pipes 76, 78, the check valves 80, 82, the pipes 62, 34 to the brake actuating cylinders 22, 24 to thereby brake the front wheels W1, W2. The braking fluid is prevented by the check valves 80, 82 from flowing back from the pipes 62, 34. Although the braking wheel cylinders 22, 24 are held in communication with the master cylinder 16 also through the pipes 34, 28, 20 and the pipes 62, 56, 20 and the directional control valves 32, 60 in the position a, the restrictions 31, 58 prevent the fluid from flowing through the directional control valves 32, 67 but cause the fluid to flow through the pipes 70, 74 and the directional control valve 72 which have a smaller resistance to fluid flow than the restrictions 31, 58. As a consequence, while the brake pedal 18 is in its first stage of depression, any abrupt pressure buildup is prevented in the master cylinder 16, giving the driver a smooth brake feeling.

The rear wheels are also braked in the same manner.

When the braking fluid pressure is increased and the front wheels W1, W2 reach and are just about to exceed the predetermined deceleration and slip rate, the control signals S1, S2 go high in level to shift the directional control valves 32, 60 toward the actuated position c in which the pipes 28, 34 and the pipes 56, 62 are disconnected, and the pipes 34, 38 and the pipes 62, 68 are connected. The brake actuating cylinders 22, 24 are now in the pressure-decreasing mode. The braking fluid now flows from the brake actuating cylinders 22, 24 through the pipes 34, 38, 62, 68, 40 into the reservoir 42. The fluid pressure pump 48 starts operating when either the control signal S1 or S2 reaches the high level, so that the braking fluid is drawn by the pump 48 from the reservoir 42, pressurized, and then delivered through the check valve 50 into the accumulator 51 and the pressure control valve 29 via the return pipe 47. The pressurized fluid is then supplied through the pressure control valve 29 to the directional control valves 32, 60, but not to the master cylinder 16. Therefore, the brake pedal 22 is not subjected to any kickback due to an unwanted pressure buildup in the pipe 20. At this time, the control unit 55 applies the control signal S3 to the solenoid 84, so that the directional control valve 72 is closed to shut off the pipes 70, 74. The same operation is carried out with respect to the rear wheels.

When the deceleration of the wheels W1, W2 reaches a prescribed level and is about to become lower than the prescribed level, the control signals S1, S2 are at the low level to actuate the directional control valves 32, 60 into the intermediate or neutral position b. The pipes 28 and 34, 38 and the pipes 56 and 62, 68 are then disconnected. The braking fluid pressure now remains maintained at a constant level. At this time, the directional control valve 72 is in the shutoff position as described above. The above operation holds true for the rear wheels.

Upon the wheels W1, W2 reaching a predetermined acceleration, the control signals S1, S2 go low to shift the directional control valves 32, 60 to the actuated position a or the pressure-increasing mode. The pipes 28, 34 and the pipes 56, 62 are brought into communication to increase the braking force on the wheels W1, W2. At this time, the directional control valve 72 remains closed, and therefore, the fluid under pressure from the master cylinder 16 is supplied through the restrictions 31, 58 and the directional control valves 32, 60 to the brake actuating cylinders 22, 24. The rate at which the fluid pressure increases in the brake actuating cylinders 22, 24 is relatively low due to the restrictions 31, 58. The brake actuating cylinders 22, 24 are therefore not subjected to an abrupt pressure increase and can brake the wheels W1, W2 under good control.

When one of the directional control valves 32, 60 is in the pressure-increasing mode and the other in one of the other modes, the directional control valve 72 is in the closed position, and the fluid under pressure from the master cylinder 16 is supplied through the restriction 31 or 58 to the directional control valve in the pressure-increasing mode. As a result, the fluid pressure in the master cylinder 16 builds up, but the driver is given no impaired brake feeling because the piston in the master cylinder 16 has already moved past a port connected to a fluid supply tank for the master cylinder 16. At this time, the rate of pressure buildup in the directional control valves 32, 60 is relatively low as the fluid is supplied thereto through the restrictions 31, 58.

FIG. 3 shows a fluid pressure control device according to another embodiment. In this embodiment, a wheel speed sensor D3 is disposed between the wheels W1, W2 for detecting the speed of rotation of the front wheels W1, W2 to control the single directional control valve 32 which is arranged to control the fluid pressure in each of the brake actuating cylinders 22, 24 for the wheels W1, W2.

Figure 4:
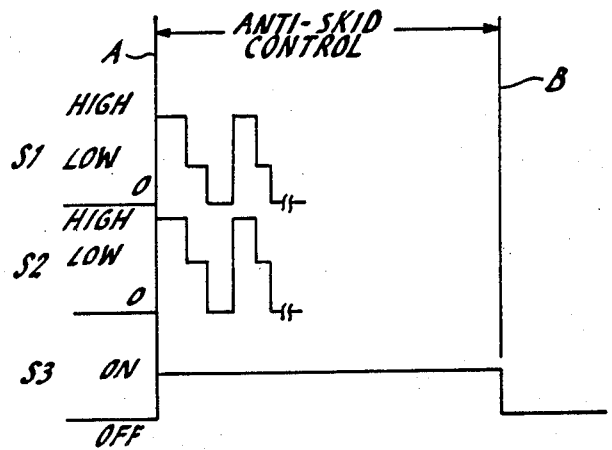
FIG. 4 is a graph showing the waveforms of signals issued from a control unit in each of the hydraulic pressure control devices of the present invention.

FIG. 4 illustrates the manner in which the signals S1, S2, S3 from the control unit 55 vary in level from the time A when the anti-skid control is started to the time B when the anti-skid control is ceased.

According to still another modification shown in FIG. 5, the restriction 31 is shunted by the directional control valve 72, and the brake actuating cylinders 22, 24 are controlled by the single directional control valve 32. With this arrangement, the check valves 80, 82 are dispensed with.

Although certain preferred embodiments of the present invention have been shown and described in detail, it should be understood that various changes and modifications may be made therein without departing from the scope of the appended claims.

What is claimed is:

1. A hydraulic pressure control device in a vehicle anti-skid braking system, comprising:
   (a) a brake master cylinder;
   (b) a wheel brake actuating cylinder for braking a vehicle wheel;
   (c) a master cylinder passage extending from said master cylinder;
   (d) a fluid pressure supply passage connected between said master cylinder passage and said wheel brake actuating cylinder;

(e) wherein a restriction is disposed in said fluid pressure supply passage;
(f) a first directional control valve disposed in said fluid pressure supply passage and having at least pressure-increasing and pressure-decreasing modes, said first directional control valve being normally in said pressure-increasing mode, in which said master cylinder passage is connected to said fluid pressure supply passage;
(g) a fluid pressure return passage connected to said first directional control valve;
(h) a pressure control valve connected to said fluid pressure return passage and said fluid pressure supply passage, said pressure control valve being normally biased to provide fluid communication between said master cylinder passage and said fluid pressure supply passage and being responsive to a fluid pressure buildup in said fluid pressure return passage when said first directional control valve is in said pressure-decreasing mode, for providing fluid communication between said fluid pressure return passage and said fluid pressure supply passage and for shutting off the fluid communication between said master cylinder passage and said fluid pressure supply passage;
(i) a second directional control valve connected between said master cylinder passage and said wheel brake actuating cylinder, said second directional control valve being normally open to provide a bypass passage across said first directional control valve in which said master cylinder passage is connected to said wheel brake actuating cylinder; and
(j) a control unit responsive to a decelerating condition of the vehicle wheel for actuating said first directional control valve into said pressure-decreasing mode and for actuating said second directional control valve to shut off said bypass passage.

2. A hydraulic pressure control device according to claim 1, further comprising a check valve disposed in said bypass passage for allowing a fluid to flow through said bypass passage only in a direction from said second directional control valve to said wheel brake actuating cylinder.

3. A hydraulic pressure control device according to claim 1, wherein said second directional control valve comprises a spring-offset solenoid-operated directional control valve having a solenoid energizable by said control unit.

4. A hydraulic pressure control device in a vehicle anti-skid braking system, comprising:
(a) a brake master cylinder;
(b) a pair of wheel brake actuating cylinders for braking a vehicle wheels, respectively;
(c) a master cylinder passage extending from said master cylinder;
(d) a pair of fluid pressure supply passages connected between said master cylinder passage and said wheel brake actuating cylinders;
(e) a pair of restrictions disposed respectively in said fluid pressure supply passages;
(f) a pair of first directional control valves disposed in said fluid pressure supply passages and each having at least pressure-increasing and pressure-decreasing modes, each of said first directional control valves being normally in said pressure-increasing mode to connect said master cylinder passage to one of said fluid pressure supply passages;
(g) a fluid pressure return passage connected to said first directional control valves;
(h) a second directional control valve connected between said master cylinder passage and said wheel brake actuating cylinders, said second directional control valve being normally open to provide a bypass passage across said first directional control valves to connect said master cylinder passage to said wheel brake actuating cylinders;
(i) a pair of check valves disposed in said bypass passage for allowing a fluid to flow through said bypass passage only in a forward direction which extends from said second directional control valve to said wheel brake actuating cylinders; and
(j) a control unit responsive to decelerating conditions of the vehicle wheels for actuating said first directional control valves into said pressure-decreasing mode and for actuating said second directional control valve to shut off said bypass passage.

5. An anti-skid control system for a vehicle, comprising:
(a) a master cylinder for providing a pressurized brake fluid;
(b) a wheel cylinder associated with a wheel of said vehicle for effectuating a braking operation of said wheel upon receipt of said brake fluid;
(c) a first supply line provided between said master cylinder and said wheel cylinder;
(d) a first switching valve connected between said first supply line and said wheel cylinder for normally enabling flow of said brake fluid from said first supply line to said wheel cylinder and for, during an anti-skid control, enabling return of said brake fluid from said wheel cylinder;
(e) a restrictor provided in said first supply line for restricting flow of said brake fluid therethrough;
(f) a second supply line provided in parallel relation with said first supply line;
(g) a second switching valve provided in said second supply line for normally enabling flow of said brake fluid from said master cylinder to said wheel cylinder therethrough and, during the anti-skid control, disabling the flow of said brake fluid to said wheel cylinder;
(h) a return line connected to said first switching valve for returning said brake fluid applied to said wheel cylinder to said first supply line when said first switching valve enables the return of said brake fluid; and
(i) a third switching valve connected to said return line and said first supply line for normally enabling the flow of said brake fluid from said master cylinder to said first supply line and, in response to said brake fluid in said return line, enabling the return of said brake fluid from said return line to said first supply line and disabling the flow of said brake fluid from said master cylinder to said first supply line.

6. An anti-skid control system according to claim 5, wherein said second supply line bypasses said third switching valve, said restrictor and said first switching valve.

7. An anti-skid control system according to claim 5, wherein said second supply line bypasses said restrictor and connected in series with said third switching valve and said first switching valve.

8. A hydraulic pressure control device according to claim 4, wherein said second directional control valve comprises a spring-offset solenoid-operated directional control valve having a solenoid energizable by said control unit.

9. An anti-skid control system according to claim 5, further comprising a check valve provided in said second supply line between said second switching valve and said wheel cylinder for enabling the flow of said brake fluid only from said second switching valve to said wheel cylinder.

* * * * *